(12) United States Patent
Joo

(10) Patent No.: US 11,768,532 B2
(45) Date of Patent: Sep. 26, 2023

(54) TRACKING APPARATUS AND METHOD OF I/O LATENCY FOR STORAGE DEVICES

(71) Applicant: KOOKMIN UNIVERSITY INDUSTRY ACADEMY COOPERATION FOUNDATION, Seoul (KR)

(72) Inventor: Yongsoo Joo, Seoul (KR)

(73) Assignee: KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 0 days.

(21) Appl. No.: 17/967,385

(22) Filed: Oct. 17, 2022

(65) Prior Publication Data
US 2023/0205303 A1   Jun. 29, 2023

(30) Foreign Application Priority Data
Dec. 23, 2021   (KR) .................. 10-2021-0185629

(51) Int. Cl.
*G06F 1/3234*   (2019.01)
*G06F 1/3228*   (2019.01)

(52) U.S. Cl.
CPC .......... *G06F 1/3278* (2013.01); *G06F 1/3228* (2013.01)

(58) Field of Classification Search
CPC .............................. G06F 1/3278; G06F 1/3228
See application file for complete search history.

(56) References Cited

U.S. PATENT DOCUMENTS

2020/0218676 A1 * 7/2020 Cao .................. G06F 13/1668
2022/0414035 A1 * 12/2022 Bai ..................... G06F 3/0683

FOREIGN PATENT DOCUMENTS

KR    10-1543102 B1    8/2015

* cited by examiner

*Primary Examiner* — Terrell S Johnson
(74) *Attorney, Agent, or Firm* — Paratus Law Group, PLLC

(57) ABSTRACT

An I/O latency tracking apparatus for storage devices includes: an I/O command generator generating an I/O command for a storage device; an I/O processor providing an I/O request to the storage device based on the I/O command and completing the I/O command by polling the storage device to check I/O completion after sleeping for a sleep time; and a sleep time adjustment unit adjusting the sleep time based on a sequence combination composed of two latest I/O sleep results among oversleep and undersleep results obtained during the polling process.

11 Claims, 12 Drawing Sheets

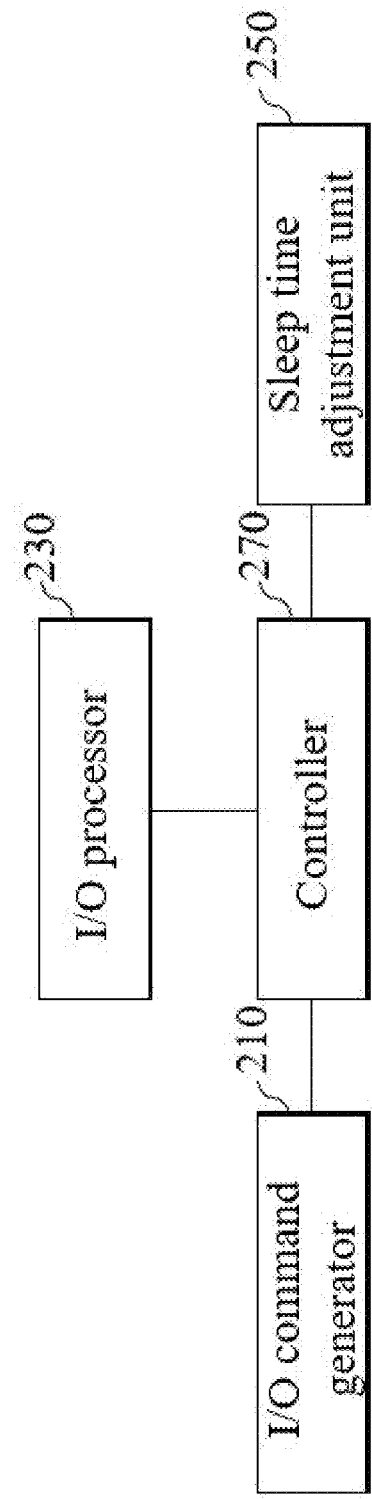

FIG. 3

Algorithm 1 Proposed I/O Latency Tracking Method

1: procedure PAS_INIT($D_{init}$)
2:     $d = D_{init}$;
3:     $r_{sl} = overslept$;
4:     $r_l = underslept$;
5:     $a = 1$;
6: end procedure

7: procedure PAS($A_{up}, A_{dn}$)
8:     SUBMIT_IO();
9:     switch ($r_{sl}, r_l$) do                      ▷ Update $a$ according to ($r_{sl}, r_l$).
10:        case 1 (*underslept, underslept*): $a = a + A_{up}$;
11:        case 2 (*underslept, overslept*): $a = 1 - A_{dn}$;
12:        case 3 (*overslept, underslept*): $a = 1 + A_{up}$;
13:        case 4 (*overslept, overslept*): $a = a - A_{dn}$;
14:     end switch
15:     if $a > 0$ then
16:        $d = d \cdot a$;                         ▷ Adjust sleep duration using the updated $a$.
17:     else
18:        $a = 1$;                              ▷ Reset $a$ to 1; $d$ is not updated.
19:     end if
20:     SLEEP($d$);
21:     $r_{sl} = r_l$;                                              ▷ Shift $r_l$ to $r_{sl}$.
22:     $r_l = $ POLL();                            ▷ POLL() informs the sleep result.
23: end procedure

Algorithm 2 PAS with a try lock

1: procedure PAS_L($A_{up}$, $A_{dn}$)
2:    has_lock = TRYLOCK(*pas_lock*);  ▷ Return false if *lock* is in use.
3:    SUBMIT_IO();
4:    if has_lock == false then
5:       SLEEP($d$);  ▷ If failed to acquire *lock*, use $d$ to sleep.
6:       POLL();
7:    else  ▷ Update variables only when acquiring *lock*.
8:       switch ($r_{sl}$, $r_l$) do
9:          case 1 (*underslept, underslept*): $a = a + A_{up}$;
10:         case 2 (*underslept, overslept*): $a = 1 - A_{dn}$;
11:         case 3 (*overslept, underslept*): $a = 1 + A_{up}$;
12:         case 4 (*overslept, overslept*): $a = a - A_{dn}$;
13:       end switch
14:       if $a > 0$ then
15:          $d = d \cdot a$;
16:       else
17:          $a = 1$;
18:       end if
19:       SLEEP($d$);
20:       $r_{sl} = r_l$;
21:       $r_l$ = POLL();
22:       UNLOCK(*pas_lock*);  ▷ Release *lock* before returning.
23:    end if
24: end procedure

TRACKING APPARATUS AND METHOD OF I/O LATENCY FOR STORAGE DEVICES

CROSS-REFERENCE TO PRIOR APPLICATION

This application claims priority to Korean Patent Application No. 10-2021-0185629 filed on Dec. 23, 2021, which is hereby incorporated by reference in its entirety.

BACKGROUND

The present disclosure relates to an I/O latency tracking technique for storage devices and, more particularly, to an I/O latency tracking apparatus and method for storage devices capable of providing lower CPU utilization and higher I/O performance when performing storage I/O operations by improving the prediction accuracy of the I/O completion time of a storage device in a computer system.

Interrupt and polling techniques are used to detect the I/O completion time in the storage device of a computer system.

Interrupt causes a requesting process to wait in the idle state immediately when the process submits an I/O request to the storage device and thus does not use the CPU while waiting for the I/O to be completed. When the I/O operation is completed, the storage device generates an interrupt to wake up the requesting process, which causes I/O performance degradation due to context switching and interrupt handler processing overhead. The I/O performance degradation is particularly problematic for recently released ultra-low-latency SSDs since the interrupt processing overhead relatively stands out due to the improved response time of recent storage devices, which is less than 10 microseconds.

A polling technique has been proposed as an alternative to solve the performance degradation. Polling repeats reading the I/O completion status register of the storage device without context switching after submission of the I/O request so that the requesting process may resume immediately without delay due to the context switch and interrupt handler call at the time of I/O completion. However, a problem occurs that the CPU usage rate rises to 100% during the process.

A hybrid polling technique has been proposed to avoid the disadvantages of interrupt and polling driven I/O and introduced in Linux kernel 4.10. The hybrid polling detects the latest I/O latency pattern, estimates the time an I/O request is expected to be completed, and prevents unnecessary CPU operations by executing a sleep function that lasts as long as the difference from the current time. Polling starts after returning from the sleep function; if the prediction of the I/O completion time is accurate, the requesting process may resume by checking I/O completion right after the polling is started.

If the I/O completion time predicted by hybrid polling is too early than the actual time, undersleep occurs, which accordingly increases the polling time and increases CPU usage. Conversely, if the prediction time is too late, oversleep occurs, which accordingly delays the requesting process from resuming, and the requesting process may experience I/O performance degradation.

The I/O completion time prediction algorithm currently used for hybrid polling implements a simple technique that calculates an average value of the recent I/O latency and sleeps the CPU for 50% of the average value. Also, the period of updating the average value is fixed at 100 ms regardless of the frequency of I/O occurrence.

The above method works effectively when the I/O latency of a storage device is stable without exhibiting fluctuations. However, the response time of SSDs may be affected by various factors, such as background I/O, conflicts among SSD internal channels, and operation delays due to garbage collection and wear-leveling operations, which may lead to a significant fluctuation in the I/O latency distribution. In the situation above, hybrid polling shows a drawback that the accuracy of predicting the I/O completion time deteriorates.

PRIOR ART REFERENCES

Patents (Patent 0001) Korea registered patent No. 10-1543102 (2015.08.03)

SUMMARY

One embodiment of the present disclosure provides an I/O latency tracking apparatus and method for storage devices capable of providing lower CPU utilization and higher I/O performance when performing storage I/O operations by improving the prediction accuracy of the I/O completion time of a storage device in a computer system.

One embodiment of the present disclosure provides an I/O latency tracking apparatus and method for storage devices capable of estimating the optimal sleep time by adjusting the sleep time used in hybrid polling for every I/O request based on the sleep result for a recent I/O request to respond to a sudden change in the I/O response time.

One embodiment of the present disclosure provides an I/O latency tracking apparatus and method for storage devices capable of estimating an optimal sleep time for a current I/O operation by performing a lock operation to adjust the sleep time only for one I/O request at a specific time point when multiple I/O requests overlap with each other.

Among embodiments, an I/O latency tracking apparatus for storage devices comprises an I/O command generator generating an I/O command for a storage device; an I/O processor providing an I/O request to the storage device based on the I/O command and completing the I/O command by polling the storage device to check I/O completion after sleeping for a sleep time; and a sleep time adjustment unit adjusting the sleep time based on a sequence combination composed of two latest I/O sleep results among oversleep and undersleep results obtained during the polling process.

The I/O command generator may perform a lock on the sleep time adjustment unit to prevent another I/O request from obtaining access rights to the sleep time adjustment unit of the storage device when the I/O command is generated.

The I/O command generator may perform an unlock on the sleep time adjustment unit to allow another I/O request to access the sleep time adjustment unit after the sleep time adjustment is completed.

The I/O processor may determine oversleep or undersleep according to the I/O request during the polling process.

The sleep time adjustment unit may update the sleep time using a value obtained by multiplying a sleep adjustment factor with a preceding sleep time.

The sleep time adjustment unit may increase the sleep adjustment factor by a first adjustment unit when the sequence combination is composed of undersleep and undersleep.

The sleep time adjustment unit may initialize the sleep adjustment factor to 1 and decrease the sleep adjustment factor by a second adjustment unit when the sequence combination is composed of undersleep and oversleep.

The sleep time adjustment unit may initialize the sleep adjustment factor to 1 and increase the sleep adjustment factor by the first adjustment unit when the sequence combination is composed of oversleep and undersleep.

The sleep time adjustment unit may decrease the sleep adjustment factor by the second adjustment unit when the sequence combination is composed of oversleep and oversleep.

The sleep time adjustment unit may reset the sleep adjustment factor and the sleep time to their initial value when the adjusted sleep time corresponds to a negative number.

Among embodiments, an I/O latency tracking method for storage devices comprises generating an I/O command generating an I/O command for a storage device; processing an I/O command providing an I/O request to the storage based on the I/O command and completing the I/O command by polling the storage device to check I/O completion after sleeping for a sleep time; and adjusting a sleep time adjusting the sleep time based on a sequence combination composed of two latest I/O sleep results among oversleep and undersleep results obtained during the polling process.

The present disclosure may provide the following effects. However, since it is not meant that a specific embodiment has to provide all of or only the following effects, the technical scope of the present disclosure should not be regarded as being limited by the specific embodiment.

An I/O latency tracking apparatus and method for storage devices according to one embodiment of the present disclosure may provide lower CPU utilization and higher I/O performance when performing storage I/O operations by improving the prediction accuracy of the I/O completion time of a storage device in a computer system.

An I/O latency tracking apparatus and method for storage devices according to one embodiment of the present disclosure may estimate the optimal sleep time by adjusting the sleep time used in hybrid polling for every I/O request based on the sleep result for a recent I/O request to respond to a sudden change in the I/O response time.

An I/O latency tracking apparatus and method for storage devices according to one embodiment of the present disclosure may estimate an optimal sleep time for a current I/O operation by performing a lock operation to adjust the sleep time only for one I/O request at a specific time point when multiple I/O requests overlap with each other.

BRIEF DESCRIPTION OF THE DRAWINGS

FIG. 2 illustrates a functional structure of the I/O latency tracking apparatus of FIG. 1.

FIG. 3 illustrates one embodiment of a sleep time adjustment algorithm according to I/O latency tracking of the present disclosure.

FIG. 5 illustrates another embodiment of a sleep time adjustment algorithm according to I/O latency tracking of the present disclosure.

DETAILED DESCRIPTION

Figure 1:
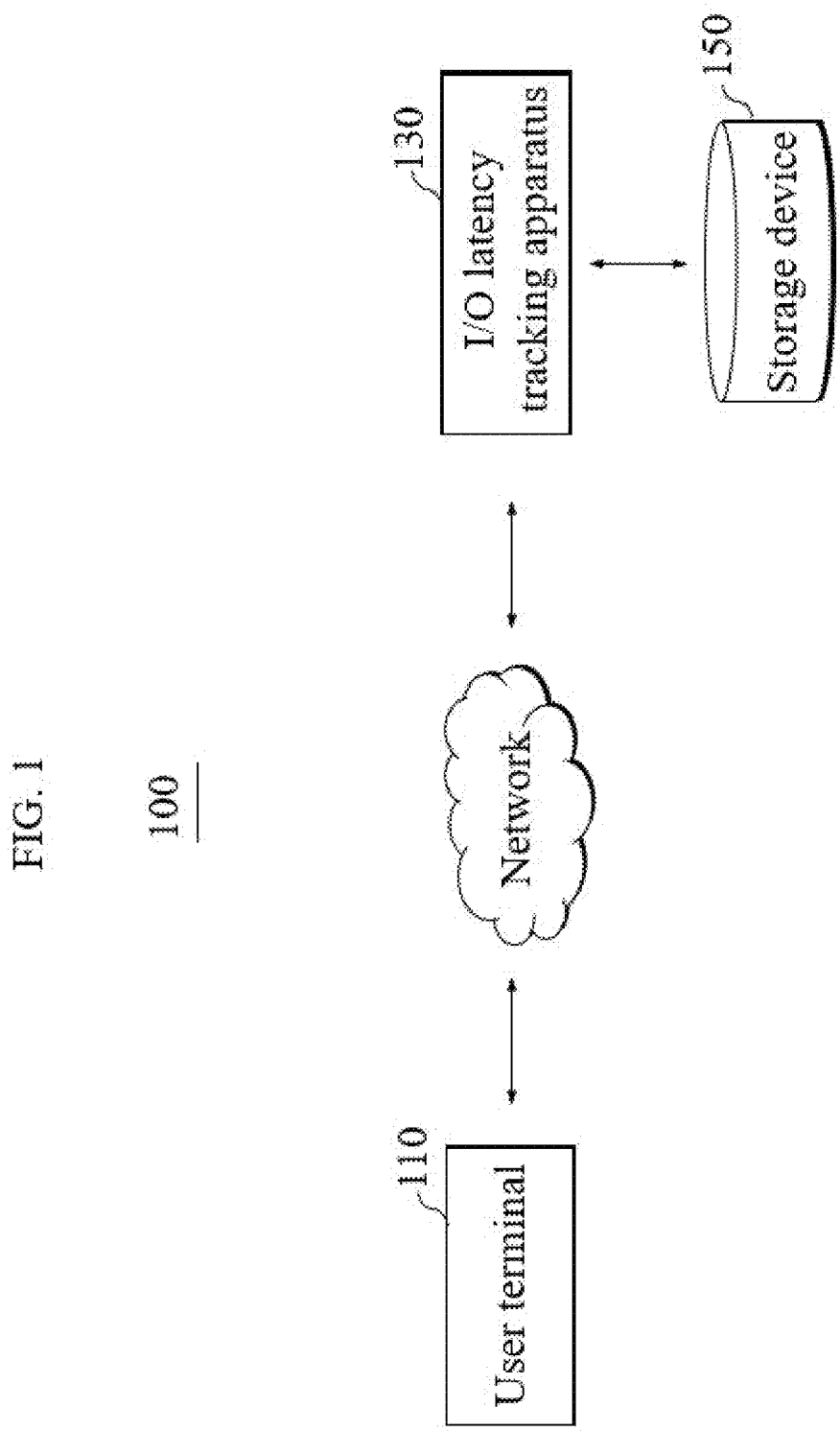
FIG. 1 illustrates an I/O latency tracking system according to the present disclosure.

Since the description of the present disclosure is merely an embodiment for illustrating structural or functional description, it should not be interpreted that the technical scope of the present disclosure is limited by the embodiments described in this document. In other words, embodiments may be modified in various ways and implemented in various forms; therefore, it should be understood that various equivalents realizing technical principles of the present disclosure belong to the technical scope of the present disclosure. Also, since it is not meant that a specific embodiment should support all of the purposes or effects intended by the present disclosure or include only the purposes or effects, the technical scope of the present disclosure should not be regarded as being limited to the descriptions of the embodiment.

Meanwhile, implication of the terms used in this document should be understood as follows.

The terms such as "first" and "second" are introduced to distinguish one element from the others, and thus the technical scope of the present disclosure should not be limited by those terms. For example, a first element may be called a second element, and similarly, the second element may be called the first element.

Suppose a constituting element is said to be "connected" to another constituting element. In that case, the former may be connected to the latter element directly, but it should be understood that a third constituting element may be present between the two elements. On the other hand, if a constituting element is said to be "directly connected" to another constituting element, it should be understood that there is no other constituting element present between the two elements. Meanwhile, other expressions describing a relationship between constituting elements, namely "between" and "right between" or "adjacent to" and "directly adjacent to" should be interpreted to provide the same implication.

A singular expression should be understood to indicate a plural expression unless otherwise explicitly stated. The term "include" or "have" is used to indicate existence of an embodied feature, number, step, operation, constituting element, component, or a combination thereof; and should not be understood to preclude the existence or possibility of adding one or more other features, numbers, steps, operations, constituting elements, components, or a combination thereof.

Identification symbols (for example, a, b, and c) for individual steps are used for the convenience of description. The identification symbols are not intended to describe an operation order of the steps. Therefore, unless otherwise explicitly indicated in the context of the description, the steps may be executed differently from the stated order. In other words, the respective steps may be performed in the same order as stated in the description, actually performed simultaneously, or performed in reverse order.

The present disclosure may be implemented in the form of program code in a computer-readable recording medium. A computer-readable recording medium includes all kinds of recording devices that store data that a computer system may read. Examples of a computer-readable recording medium include a ROM, a RAM, a CD-ROM, a magnetic tape, a floppy disk, and an optical data storage device. Also, the computer-readable recording medium may be distributed over computer systems connected through a network so that computer-readable code may be stored and executed in a distributed manner. Unless defined otherwise, all the terms used in the present disclosure provide the same meaning as understood generally by those skilled in the art to which the present disclosure belongs. Those terms defined in ordinary dictionaries should be interpreted to have the same meaning as conveyed in the context of related technology. Unless otherwise defined explicitly in the present disclosure, those terms should not be interpreted to have ideal or excessively formal meaning.

Interrupts have been the de facto standard for detecting the completion of storage I/O operations because interrupts may effectively handle a speed difference between a memory and a hard disk drive (HDD). Even after solid-state drives (SSDs) began to take up HDDs, the preference for interrupts did not change significantly. However, the situation is changing as state-of-the-art SSDs start to provide not only high capacity and transfer bandwidth but also extremely low I/O latency. In particular, Ultra-Low Latency (ULL) SSDs may complete an I/O operation within 10 µs. The low latency of ULL SSDs further accentuates the overhead of interrupts due to context switching, cache contamination, and CPU power state transition latency.

Polling is considered an alternative that avoids the overhead of interrupts mentioned above. Polling has the potential to utilize the original performance of ULL SSDs fully but has a fatal weakness in that CPU usage reaches 100% until I/O is completed. Hybrid polling is proposed as a solution to remedy the shortcomings of the two.

Hybrid polling operates by sleeping the first part of the I/O processing time and then waking up and polling the rest of the I/O processing time until the I/O is complete. As a result, the effectiveness of hybrid polling is determined by the accuracy of estimating the time the current I/O is completed. Ideally, it is best to wake up from sleep just before I/O is completed, which is impossible because the future may not be fully predictable. In practice, hybrid polling either wakes up too early before I/O completion and increases CPU usage or wakes up too late and increases the perceived I/O latency of an application. Therefore, the optimization goal of hybrid polling is to minimize the interval between waking up from sleep and actual I/O completion. The goal may be achieved by accurately estimating the constantly changing device I/O latency and adjusting the sleep time accordingly.

Hybrid polling maintains statistics on the recent I/O latency and determines the sleep time based on the statistics. In particular, hybrid polling calculates the average delay time for I/O operations of the same size, which have occurred recently, and empirically uses half the average delay time as the sleep time. The 50 percent attenuation effectively serves as a safety margin to prevent oversleeping against high I/O time fluctuations. The statistical value is updated every 100 ms to reflect the changes in the I/O latency of a storage device. However, it can be inefficient to simply use constant values instead of dynamically adjusting the safety margin and update period. For example, rapid change of I/O workload, performing complex internal tasks of SSD, and concurrent processing of I/Os of different sizes may seriously degrade the I/O latency tracking performance of hybrid polling.

The present disclosure proposes a new I/O latency tracking technique to improve a storage device's I/O latency tracking performance, which is a key element of hybrid polling. The present disclosure may improve tracking performance by exponentially adjusting the sleep time and dynamically adjusting the growth and decay rates using the sleep results of the two most recent I/O operations. The present disclosure may (1) adjust sleep time in a fast and timely manner for all I/Os, (2) continuously compensate for the difference between expected I/O latency and actual I/O latency using the most up-to-date feedback, and (3) pursue promptness, accuracy, and safety through reducing the sleep time quickly when waking up later than the actual I/O completion. In what follows, an I/O latency tracking apparatus and method for storage devices according to the present disclosure will be described in detail with reference to FIGS. 1 to 12.

FIG. 1 illustrates an I/O latency tracking system according to the present disclosure.

Referring to FIG. 1, the I/O latency tracking system 100 may comprise a user terminal 110, an I/O latency tracking apparatus 130, and a storage device 150.

The user terminal 110 may correspond to a computing device that may use the operation related to I/O latency tracking of the storage device 150 in conjunction with the I/O latency tracking apparatus 130, which may be implemented by a smartphone, a laptop computer, or a computer; the user terminal 110 is not limited to the example above, and other various devices such as a tablet PC may also be used to implement the user terminal 110. The user terminal 110 may be connected to the I/O latency tracking apparatus 130 through a network, and at least one user terminal 110 may be simultaneously connected to the I/O latency tracking apparatus 130; preferably, the I/O latency tracking apparatus 130 may be implemented inside the user terminal 110. Also, the user terminal 110 may install and execute a dedicated program or application for operating in conjunction with the I/O latency tracking apparatus 130.

The I/O latency tracking apparatus 130 may be implemented as a computing device for tracking I/O latency of the storage device 150 by applying a method for adjusting the sleep time of hybrid polling according to the present disclosure or a server corresponding to the computing device. For example, the I/O latency tracking apparatus 130 may include the Linux kernel, which is a computer operating system. The I/O latency tracking apparatus 130 may be connected to the user terminal 110 through a network and exchange related data. Also, the I/O latency tracking apparatus 130 may generate at least one I/O command for the storage device 150 and complete the I/O command by polling whether the I/O operation of the storage device 150 is completed. The I/O latency tracking apparatus 130 may estimate the optimal sleep time by adjusting the sleep time at each I/O request based on a sleep result for the I/O request in the polling process and responding to a rapid change in the I/O latency.

The storage device 150 may correspond to various types of memories. The storage device 150 may be implemented using a non-volatile or volatile memory and used to store the overall data required to execute an application of the user terminal 110. For example, the storage device 150 may correspond to a solid state drive (SSD).

FIG. 2 illustrates a functional structure of the I/O latency tracking apparatus of FIG. 1.

Referring to FIG. 2, the I/O latency tracking apparatus 130 may implement a prompt, accurate, and safe I/O latency tracking technique for determining the sleep time of hybrid polling and may comprise an I/O command generator 210, an I/O processor 230, a sleep time adjustment unit 250, and a controller 270.

The I/O command generator 210 may generate an I/O command for the storage device 150.

The I/O processor 230 may provide an I/O request to the storage device 150 based on the I/O command and complete the I/O command by polling I/O completion of the storage device 150 after the sleep time.

The sleep time adjustment unit 250 may adjust the sleep time based on a sequence combination composed of sleep results for the two most recent I/O operations among oversleep and undersleep obtained during the polling process. FIG. 3 illustrates one embodiment of a sleep time adjustment algorithm according to I/O latency tracking.

Referring to FIG. 3, a sleep time adjustment algorithm according to one embodiment may be composed of two procedures of PAS_INIT ($D_{init}$) and PAS ($A_{up}$, $A_{dn}$). The first procedure PAS_INIT ($D_{init}$) initializes various parameters used for sleep time adjustment to appropriate values so that the initially generated I/O request may refer to the parameters. Here, PAS_INIT ($D_{init}$) may be executed once when the operating system is set to the hybrid polling mode. Variables used for sleep time adjustment may be defined as follows.

d represents the sleep time for the current I/O, $D_{init}$ the initial sleep time, $r_{sl}$ a sleep result (oversleep or undersleep) of the second to last I/O, $r_l$ a sleep result (oversleep or undersleep) of the last I/O, a the sleep adjustment factor (0<a), $A_{up}$ a first adjustment unit (0<$A_{up}$), and $A_{dn}$ a second adjustment unit (0<$A_{dn}$<1). During the operation initialization, d may be set to the initial sleep time ($D_{init}$), $r_{sl}$ and $r_l$ may be set to oversleep and undersleep, respectively, and a may be set to 1.

The second procedure PAS ($A_{up}$, $A_{dn}$) updates the sleep adjustment factor (a) and the sleep time according to the sleep results of the two most recent I/O operations and performs sleep and polling. The second procedure is executed for all I/Os. Polling may return oversleep or undersleep as a sleep result and update the $r_{sl}$ and $r_l$ values so that subsequent I/Os may refer to the $r_{sl}$ and $r_l$ values. In one embodiment, the I/O processor 230 may determine oversleep or undersleep according to the I/O request during the polling process. Here, the I/O processor 230 may repeatedly check the I/O completion queue of the storage device 150 and deliver oversleep as a sleep result when the I/O is already completed at the initial checking; otherwise, undersleep is delivered.

The sleep adjustment factor (a) may be updated according to the value of ($r_{sl}$, $r_l$), which is a sequence combination of sleep results of the two most recent I/Os. The sequence combination ($r_{sl}$, $r_l$) may express four cases: (undersleep, undersleep), (undersleep, oversleep), (oversleep, undersleep), and (oversleep, oversleep). If sleep results of the two most recent I/Os are the same, namely, case 1 or case 4 of the algorithm of FIG. 3, it is regarded as being in an excessive undersleep or oversleep state, and the value of the sleep adjustment factor (a) is increased by the first adjustment unit ($A_{up}$) or decreased by the second adjustment unit ($A_{dn}$). In one embodiment, the sleep time adjustment unit 250 may increase the sleep adjustment factor (a) by the first adjustment unit ($A_{up}$) when the sequence combination consists of undersleep and undersleep (a=a+$A_{up}$). In one embodiment, the sleep time adjustment unit 250 may decrease the sleep adjustment factor (a) by the second adjustment unit ($A_{dn}$) when the sequence combination consists of oversleep and oversleep (a=a-$A_{dn}$).

If sleep results of the two most recent I/Os are different, namely, case 2 or case 3 of the algorithm of FIG. 3, it may be regarded that the sleep time has reached the actual I/O latency and just passed in the opposite direction. Therefore, the value of the sleep adjustment factor (a) is initialized to 1 and increased by the first adjustment unit ($A_{up}$) or decreased by the second adjustment unit ($A_{dn}$). In one embodiment, when the sequence combination consists of undersleep and oversleep, the sleep time adjustment unit 250 may initialize the sleep adjustment factor (a) to 1 and decrease the sleep adjustment factor (a) by the second adjustment unit $A_{dn}$ (a=1-$A_{dn}$). In one embodiment, when the sequence combination consists of oversleep and undersleep, the sleep time adjustment unit 250 may initialize the sleep adjustment factor (a) to 1 and increase the sleep adjustment factor (a) by the first adjustment unit $A_{up}$ (a=1+$A_{up}$). If the value of the updated sleep adjustment factor (a) is becomes larger than "0", the sleep time (d) may be adjusted by multiplying the sleep adjustment factor (a) to it. However, an exceptional situation occurs if the sleep adjustment factor (a) is less than or equal to "0", in which the sleep time (d) becomes 0 or a negative number. Once this type of exception is detected, the sleep adjustment factor (a) may be initialized to 1. In one embodiment, the sleep time adjustment unit 250 may reset the sleep adjustment factor (a) and the sleep time (d) by invoking PAS INIT ($D_{init}$) when the sleep time becomes a negative number despite the above exception handling procedure. The I/O processor 230 may perform polling after sleep for the sleep time (d).

Figure 4:
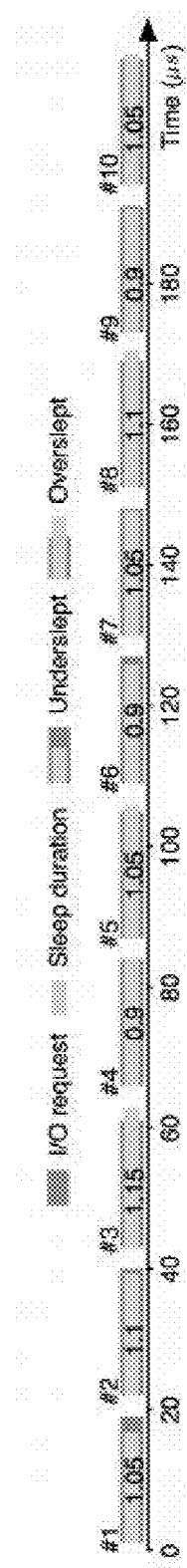
FIG. 4 illustrates a method for updating a sleep adjustment factor according to the present disclosure.

FIG. 4 illustrates a method for updating the sleep adjustment factor according to the present disclosure; the figure shows how the value of the sleep adjustment factor (a) and the sleep result change for a setting in which ($D_{init}$, $A_{up}$, $A_{dn}$)=(15 μs, 0.05, 0.1).

In FIG. 4, sleep time continuously increases through I/O #1 to #3 until reaching the I/O latency of a storage device. A first oversleep occurs on I/O #3, and I/O #4 detects (undersleep, oversleep) from the sleep results of I/O #2 and #3. Therefore, the present disclosure transitions to case 2 and updates the sleep adjustment factor (a) so that the sleep adjustment factor (a) becomes 1-$A_{dn}$ (=1-0.1=0.9), effectively initializing the sleep adjustment factor regardless of its last value. For example, even if the value of the last sleep adjustment factor becomes excessively large due to continuous undersleep, it may be immediately reduced to 1-$A_{dn}$, enabling an instant reaction against oversleep. The present disclosure maintains a poll time close to zero by avoiding excessive undersleep or oversleep after I/O #4.

The present disclosure may adjust sleep time for every I/O instead of using a constant sleep time for a predetermined sampling epoch of 100 ms. Through the operation, the present disclosure may quickly and timely track the constantly changing I/O latency of a storage device. Also, the present disclosure utilizes the immediate feedback of the two most recent I/Os instead of using half the average I/O latency of the previous sampling epoch. The feedback quality is unaffected by the frequency of I/O occurrence, which may fluctuate between zero and millions of I/Os per second (IOPS). The present disclosure may minimize both the steady state and transient state errors by adjusting not only the sleep time but also the sleep adjustment factor using the corresponding information. When oversleep occurs, the present disclosure may respond immediately to reduce the sleep time for the next I/O instead of waiting until the next sampling epoch to update the I/O statistics values. Also, the present disclosure may effectively limit the I/O performance degradation due to oversleep by setting the second adjustment unit ($A_{dn}$) to be higher than the first adjustment unit ($A_{un}$).

With an assumption that all I/Os are serialized, that is, a valid queue depth (QD) does not exceed 1, the algorithm of FIG. 3 proposed by the present disclosure may always use the sleep result of a last submitted I/O to update the sleep adjustment factor for the present I/O. In practice, however, multiple processes may submit I/Os simultaneously. The state-of-the-art SSDs may handle multiple outstanding I/Os in parallel. Nested I/Os cause difficulty in adequately maintaining statistics and control variables of the present disclosure. There are three possible problems with nested I/Os as follows.

Problem 1: Outdated sleep results may be referenced. If multiple I/Os are submitted consecutively, it is often impossible to determine the sleep results of the previously submitted I/Os when updating the sleep adjustment factor for the present I/Os. The only option is to use the last sleep results recorded in $(r_{sl}, r_l)$, but these values do not reflect the most recent trend of undersleep or oversleep.

Problem 2: Important sleep results are omitted. Overlapping I/Os generate multiple sleep results in succession; only the last two sleep results in $(r_{sl}, r_l)$ remain, and all others are lost. If a (undersleep, oversleep) or a (oversleep, undersleep) pair is lost during this process, the sleep adjustment factor (a) may not be reset to $1-A_{dn}$ or $1+A_{up}$, resulting in a slow response.

Problem 3: Concurrent access to statistics variables. Since four variables d, $(r_{sl}, r_l)$, and a are shared among multiple I/Os of the same size, protection is needed to prevent erroneous updates. However, when a critical section is implemented using a typical spin lock method to protect the statistics variables from concurrent accesses, not only excessive lock contention occurs, but virtually all concurrent I/Os are serialized, resulting in severe I/O performance degradation.

FIG. 6(a) shows an example in which the present disclosure exhibits unexpected behavior for overlapping I/Os; the example shows that when the queue depth is 4, the algorithm of FIG. 3 does not operate properly. Since oversleep occurs on I/O #3, I/O #4 is supposed to refers to the sleep results $(r_{sl}, r_l)$=(undersleep, oversleep) of I/O #2 and #3 to update the sleep adjustment factor (a); however, Problem 1 occurs because the corresponding sleep results have not yet been obtained. I/O #4 updates the sleep adjustment factor (a) value based on the sleep result (undersleep, undersleep) that was last recorded in $(r_{sl}, r_l)$ but does not reflect the latest trend anymore, where the former is taken from line 4 of the algorithm shown in FIG. 3, and the latter is 5 taken from I/O #1. In fact, the overlapped I/O #2 to #5 all refers to the same stale sleep results when they update sleep duration. The consequence is that they cannot detect oversleeping and exponentially increase sleep duration, resulting in severe oversleeping.

Also, while I/O #2, #3, #4, and #5 are successively completed, all but the last two sleep results are lost; Problem 2 occurs because the result (undersleep, oversleep) occurring between I/O #2 and #3 disappears. Therefore, I/O #6 to #9 may observe the sleep results of only I/O #4 and #5, namely, (oversleep, oversleep), and loses the opportunity to reset the sleep adjustment factor (a) value to $1-A_{dn}$=0.9. As a result, oversleep continues to accumulate until I/O #10. Problem 2 occurs again due to missing pairs (oversleep, undersleep) in I/O #10 to #11. As a result, excessive undersleep occurs in I/O #14 to #17. To relieve the above problem, the I/O command generator 210 may perform a lock on the sleep time adjustment unit 250 so that, when the sleep time adjustment unit 250 is in use, another I/O request to the storage device 150 does not obtain access to the sleep time adjustment unit 250. When the I/O is completed, the I/O command generator 210 may unlock the sleep time adjustment unit 250 so that another I/O request may access the sleep time adjustment unit 250. Here, an I/O operation failing to obtain a lock is allowed to only sleep by referring to the sleep time of the sleep time adjustment unit 250, while an I/O operation succeeding in obtaining a lock controls the sleep time adjustment unit 250 directly to calculate a new sleep adjustment factor and update the sleep time. Also, the sleep time adjustment unit 250 stores a sleep result obtained from polling so that the next I/O that has acquired rights to control the sleep time adjustment unit 250 may refer to the sleep result. In this regard, the present disclosure proposes an algorithm shown in FIG. 5 that may perform a lock on the rights to control the sleep time.

FIG. 5 illustrates another embodiment of a sleep time adjustment algorithm according to I/O latency tracking of the present disclosure.

Referring to FIG. 5, in the sleep time adjustment algorithm according to another embodiment, each I/O request in the sleep time adjustment algorithm according to another embodiment receives a result of success or failure immediately upon attempting to obtain a lock on line 2. The TRY_LOCK( ) function in line 2 attempts to obtain the lock only once and immediately returns success or failure. An I/O operation failing to acquire a lock does not retry until the operation succeeds but executes lines 5 to 6 without a lock. In other words, since the I/O operation does not obtain the right to adjust the sleep time, the I/O operation refers only to the current sleep time to perform sleep and polling and terminates. An I/O operation that successfully acquires a lock enters the critical section of lines 7 to 23 and updates statistics and control variables. By using the algorithm of FIG. 5, only one I/O performs sleep adjustment at a specific time point, so the side effect of FIG. 6(a) mentioned above may be avoided. FIG. 6(b) illustrates the description above.

Figure 6:
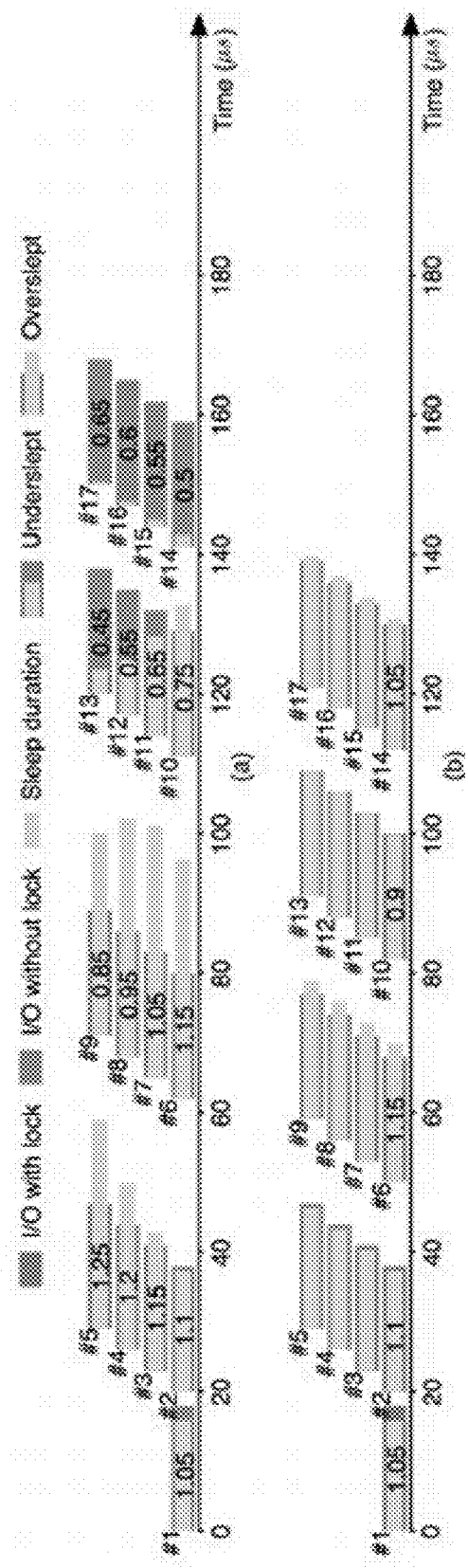
FIG. 6 illustrates a response time tracking method according to the present disclosure when multiple I/O operations are processed.

FIG. 6 compares the response of the algorithm of FIG. 5 (in what follows, it is referred to as "algorithm 2") with the response of the algorithm of FIG. 3 (in what follows, it is referred to as "algorithm 1") in the same sequence of overlapping I/Os. A lock attempt (#1, #2 , #6 , #10 , #14) generates a single stream of non-overlapping I/Os that acquire a lock on (#1, #2 , #6 , #10 , #14). Algorithm 2 may effectively avoid Problems 1 and 2 because only these I/Os update the sleep time adjustment control variable. Also, Problem 3 may be solved by using a lock based on algorithm 2. An I/O operation that fails to acquire a lock may proceed to the next step immediately without waiting for a lock to be acquired. The controller 270 controls the overall operation of the I/O latency tracking apparatus 130 and manage a control flow or a data flow among the I/O command generator 210, the I/O processor 230, and the sleep time adjustment unit 250.

Figure 7:
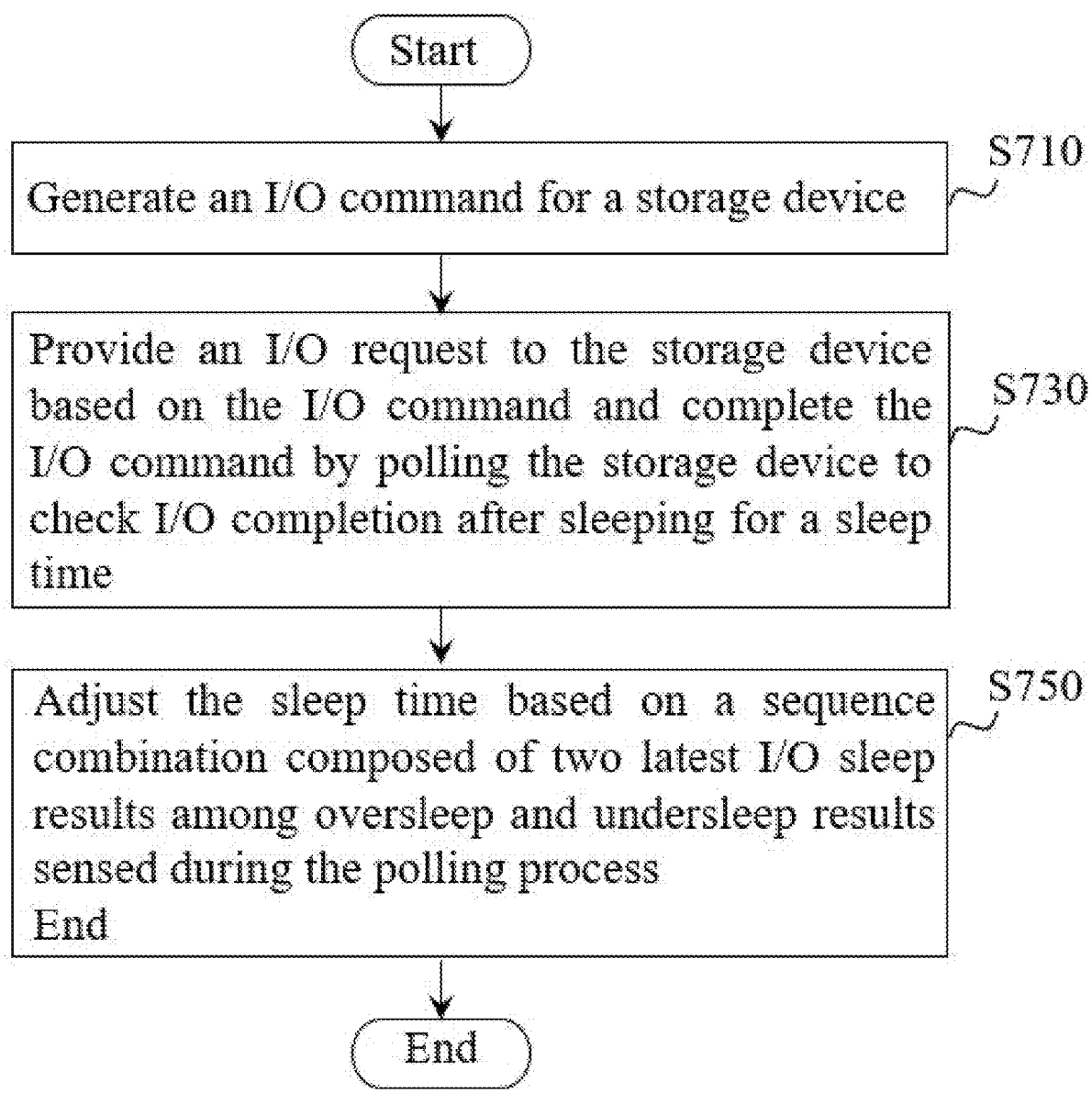
FIG. 7 is a flow diagram illustrating an I/O latency tracking method for storage devices according to the present disclosure.

FIG. 7 is a flow diagram illustrating an I/O latency tracking method for storage devices according to the present disclosure. Referring to FIG. 7, the I/O latency tracking apparatus 130 may generate an I/O command for the storage device 150 through the I/O command generator 210 S710. The I/O latency tracking apparatus 130 may provide an I/O request to the storage device 150 based on the I/O command and complete the I/O command by polling the storage device 150 to check I/O completion after sleeping for a sleep time S730. The I/O latency tracking apparatus 130 may adjust the sleep time based on a sequence combination composed of at least one of oversleep and undersleep results obtained through the sleep time adjustment unit 250 during the polling process S750.

FIGS. 8 to 12 are graphs showing performance analysis experimental results related to the present disclosure.

Referring to 8 to 12, the I/O latency tracking apparatus 130 performs simulation-based offline analysis before integration into the operating system. The simulation tool may increase effective variable control and performance analysis accuracy of the present disclosure by securing traces for a series of I/O latencies and analysis through offline simulation. Also, the simulation tool may calculate the amount of not only undersleep but also oversleep, which is difficult to measure inside the OS kernel.

The simulation tool uses a series of I/O latency values extracted from an actual system as input. At this time, the system is configured to use a typical polling scheme to extract the SSD I/O latency value in a state not affected by sleep estimation of hybrid polling.

The simulation tool calculates the amount of undersleep or oversleep time by changing the first and second adjustment unit values ($A_{up}$, $A_{dn}$) of the present disclosure for the input traces.

In particular, the simulation tool calculates a set of metrics as follow: $t_{under}$ and $t_{over}$ represent the accumulated time of under and oversleeping duration of each I/O; $t_{trace}$ represents a sum of device latency values of an input trace; and $T_{under}$ and $T_{over}$ represent normalized values of $t_{under}$ and $t_{over}$ which may be obtained from division by $t_{trace}$.

The calculated $t_{under}$ and $t_{over}$ are shown in Table 1 below.

TABLE 1

| | | $A_{up}$ | | | |
|---|---|---|---|---|---|
| | $A_{dn}$ | 0.001 | 0.01 | 0.1 | 1 |
| $T_{over}$ | 0.001 | 0.51 | 0.76 | 0.92 | 1.93 |
| | 0.01 | 0.08 | 0.14 | 0.68 | 1.44 |
| | 0.1 | 0.01 | 0.03 | 0.15 | 0.78 |
| | 0.99 | 0.00 | 0.01 | 0.05 | 0.36 |
| $T_{under}$ | 0.001 | 0.27 | 0.06 | 0.02 | 0.01 |
| | 0.01 | 0.59 | 0.42 | 0.09 | 0.04 |
| | 0.1 | 0.67 | 0.55 | 0.40 | 0.2 |
| | 0.99 | 0.93 | 0.90 | 0.85 | 0.72 |

$T_{under}$ represents CPU usage due to polling, and $T_{over}$ represents performance degradation due to oversleeping.

The simulation tool may provide a result of how $T_{under}$ and $T_{over}$ change by different combinations of ($A_{up}$, $A_{dn}$). For example, the simulation tool may set ($A_{up}$, $A_{dn}$) to 0.001 and repeat incrementing the value by a factor of 10 until the value reaches 1. In Table 1, $A_{dn}$ is set to 0.99 rather than 1 because, when it is set to 1, a side effect of making the sleep adjustment factor (a) to zero happens when case 3 occurs in FIG. 5.

In Table 1, the following procedure may be followed to select the optimal ($A_{up}$, $A_{dn}$) combination. In rows 2 to 5 of Table 1, only the cells (gray) for which $T_{over}$ is 0.05 or less, that is, performance degradation is 5% or less are selected, and other remaining cells are discarded. Among the selected cells, a cell with the lowest $T_{under}$ value (0.01, 0.1) in rows 6 to 9 is selected as a reference setting (numbers in blue), and the four adjacent cells (numbers in red) are selected for comparison with the reference configuration. Each selected cell is named as follows.

BL (baseline): ($A_{up}$=0.01, $A_{dn}$=0.1)
RS (rising slower): ($A_{up}$=0.001, $A_{dn}$=0.1)
RF (rising faster): ($A_{up}$=0.1, $A_{dn}$=0.1)
FS (falling slower): ($A_{up}$=0.01, $A_{dn}$=0.01)
FF (falling faster): ($A_{up}$=0.01, $A_{dn}$=0.99).

The results obtained by applying the ($A_{up}$, $A_{dn}$) combinations to the present disclosure are denoted as PAS(BL), PAS(RS), PAS(RF), PAS(FS), and PAS(FF), respectively.

Figure 8:
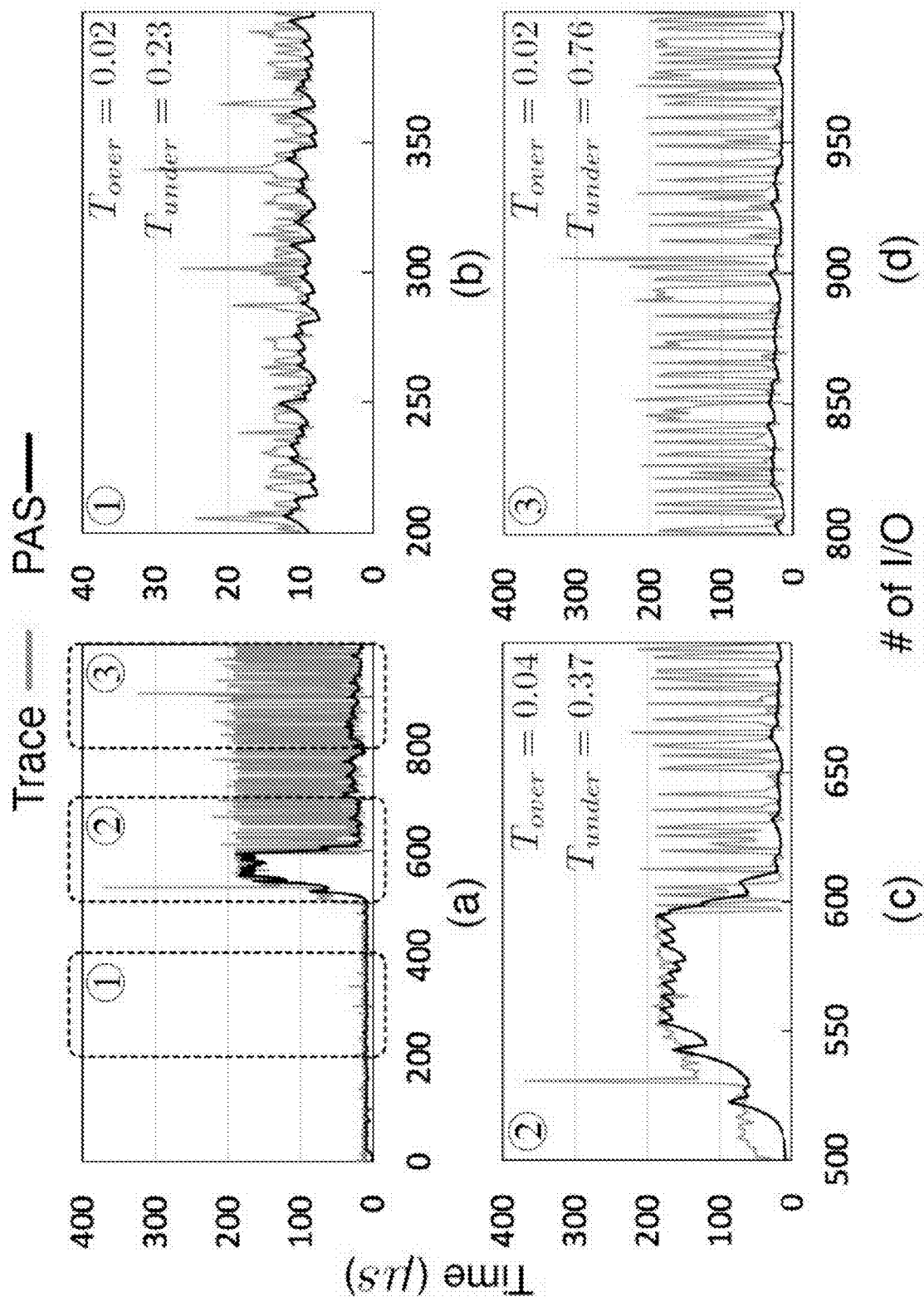
FIGS. 8 to 12 are graphs showing performance analysis experimental results related to the present disclosure.

FIG. 8 shows a case in which PAS (BL) tracks the I/O latency change of the input trace. FIGS. 8(b) to (d) enlarges three different areas of FIG. 8(a) for clarity. FIG. 8(b) shows a case exhibiting visible latency fluctuations and many abnormal latency values increasing rapidly beyond 25 ρs even though only 4 KB I/Os of the same size are generated. PAS(BL) tracks the lower bound of the latency distribution well without being affected by the abnormal values. FIG. 8(c) shows an area in which 32 KB I/Os disturb the latency of 4 KB I/Os, resulting in the most unstable latency distribution. The trace I/O latency increases slightly to about 170 ρs and then drops to about 25 μs, with many outliers lying in the 50 to 200 ρs range. PAS(BL) carefully increases the sleep time to approximate the actual I/O latency while effectively suppressing excessive oversleep. On the other hand, when the trace I/O latency starts to decrease suddenly, PAS(BL) quickly reduces the sleep time and escapes from oversleep. The present disclosure shows stable performance pursuing the lower envelope of the latency distribution even in FIG. 8(d).

Figure 9:
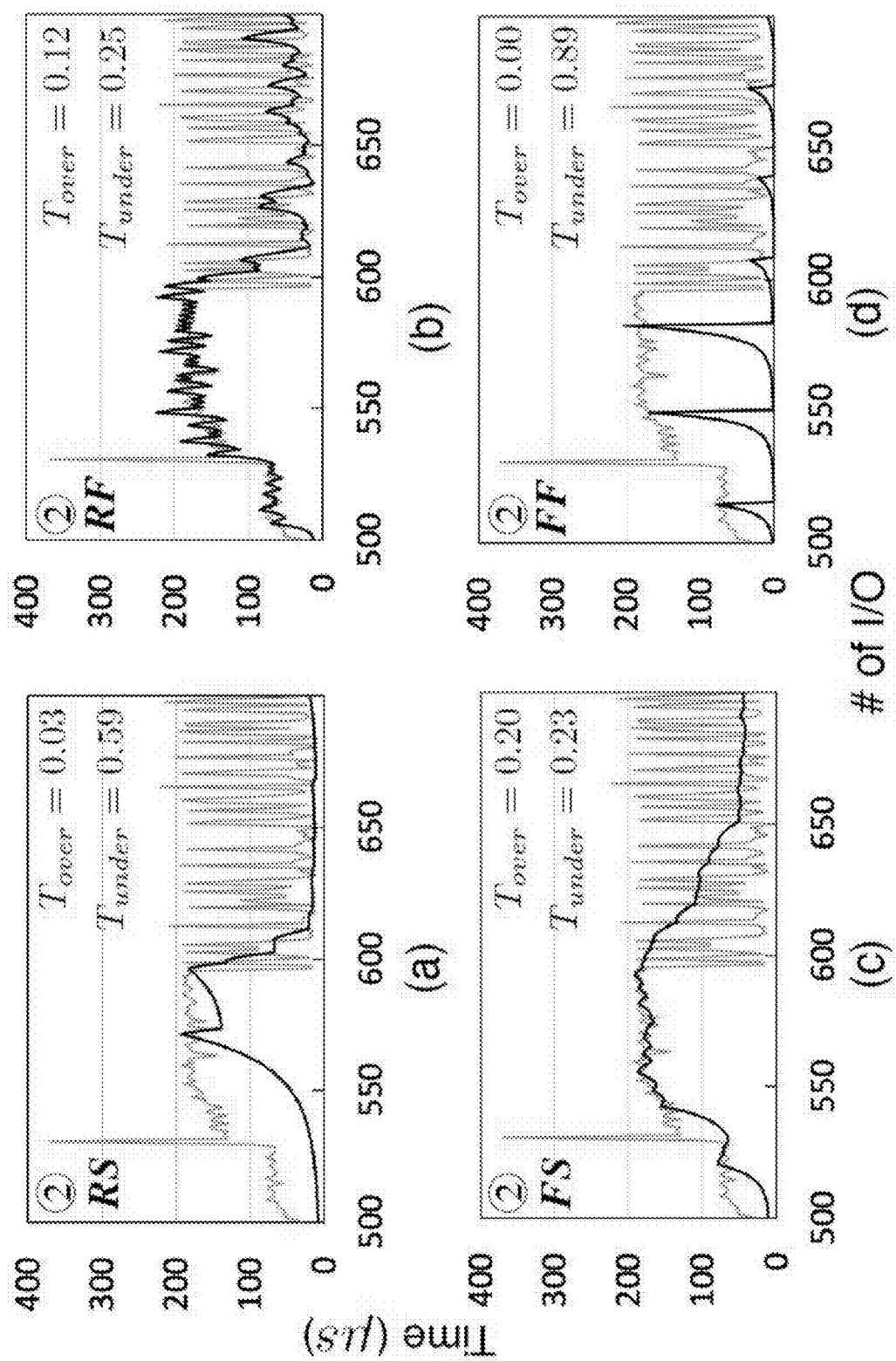

FIG. 9 compares I/O latency tracking aspects for four target cells adjacent to the reference configuration BL. In FIG. 9(a), PAS(RS) increases $T_{under}$ by 22% while decreasing $T_{over}$ by 1%. On the other hand, FIGS. 9(b) and (c) show that PAS (RF) and PAS (FS) decrease $T_{under}$ by 12% and 14%, respectively. However, the resulting $T_{over}$ values are 12% and 20%, severely reducing the performance benefits of polling against interrupts. In FIG. 9(d), PAS(FF) shows that $T_{over}$ is almost zero. In other words, I/O performance is expected to be close to typical polling. However, the resulting CPU usage also rises to about 90% due to the increased $T_{under}$.

Figure 10:
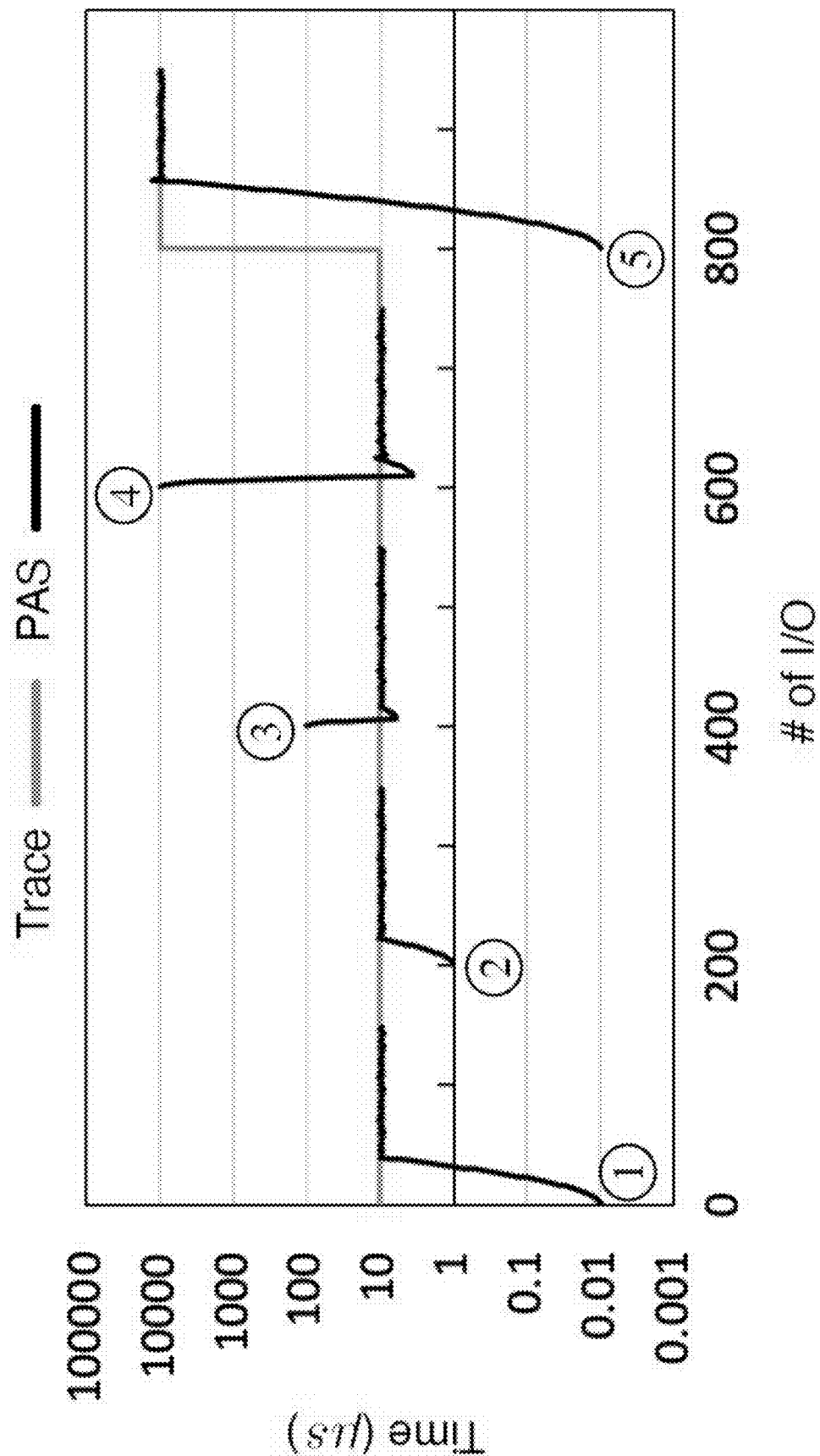

The simulation tool may be utilized to analyze the effect of changing $D_{init}$ on the initial ramp time $t_{ramp}$, in other words, the time it takes PAS(BL) to pass the input trace latency for the first time. For example, an input trace consisting of first 800 I/Os of 10 μs and the remaining 200 I/Os of 10 ms may be synthesized. FIG. 10 and Table 2 summarize the results of five tests performed while changing $D_{init}$ from 0.01 μs to 10 ms.

TABLE 2

| Test No. | $t_{trace}$ | $t_{under}$ | $t_{over}$ | $t_{ramp}$ | $n_{ramp}$ |
|---|---|---|---|---|---|
| ① | 0.40 ms | 0.36 ms | — | 0.40 ms | 40 |
| ② | 0.23 ms | 0.16 ms | — | 0.23 ms | 23 |
| ③ | 0.07 ms | — | 0.30 ms | 0.37 ms | 7 |
| ④ | 0.1 ms | — | 37.0 ms | 37.1 ms | 10 |
| ⑤ | 580 ms | 547 ms | — | 580 ms | 58 |

In Table 2, $n_{ramp}$ represents the number of I/Os processed for $t_{ramp}$.

In tests ① and ②, undersleeping occurs until PAS(BL) reaches 10 μs. However, the accumulated $t_{under}$ only affects the CPU usage and does not affect the ramp time. The ramp time of tests ① and ② is equal to $t_{trace}$ value, which is determined by the number of I/Os processed until settlement. In tests ③ and ④, oversleeping occurs to accumulate $t_{over}$, which are added to $t_{trace}$ to significantly enlarge the ramp time. Test ⑤ shows an extreme case in which PAS (BL) starts with a sleep time of 10 ns and increases up to a maximum of 10 ms (1,000,000×). The resulting ramp time of 580 ms corresponds to 58 I/Os.

PAS(BL) can avoid initial I/O performance degradation due to $t_{over}$ by setting the value of $D_{init}$ shorter than the average I/O latency of a target storage device.

Figure 11:
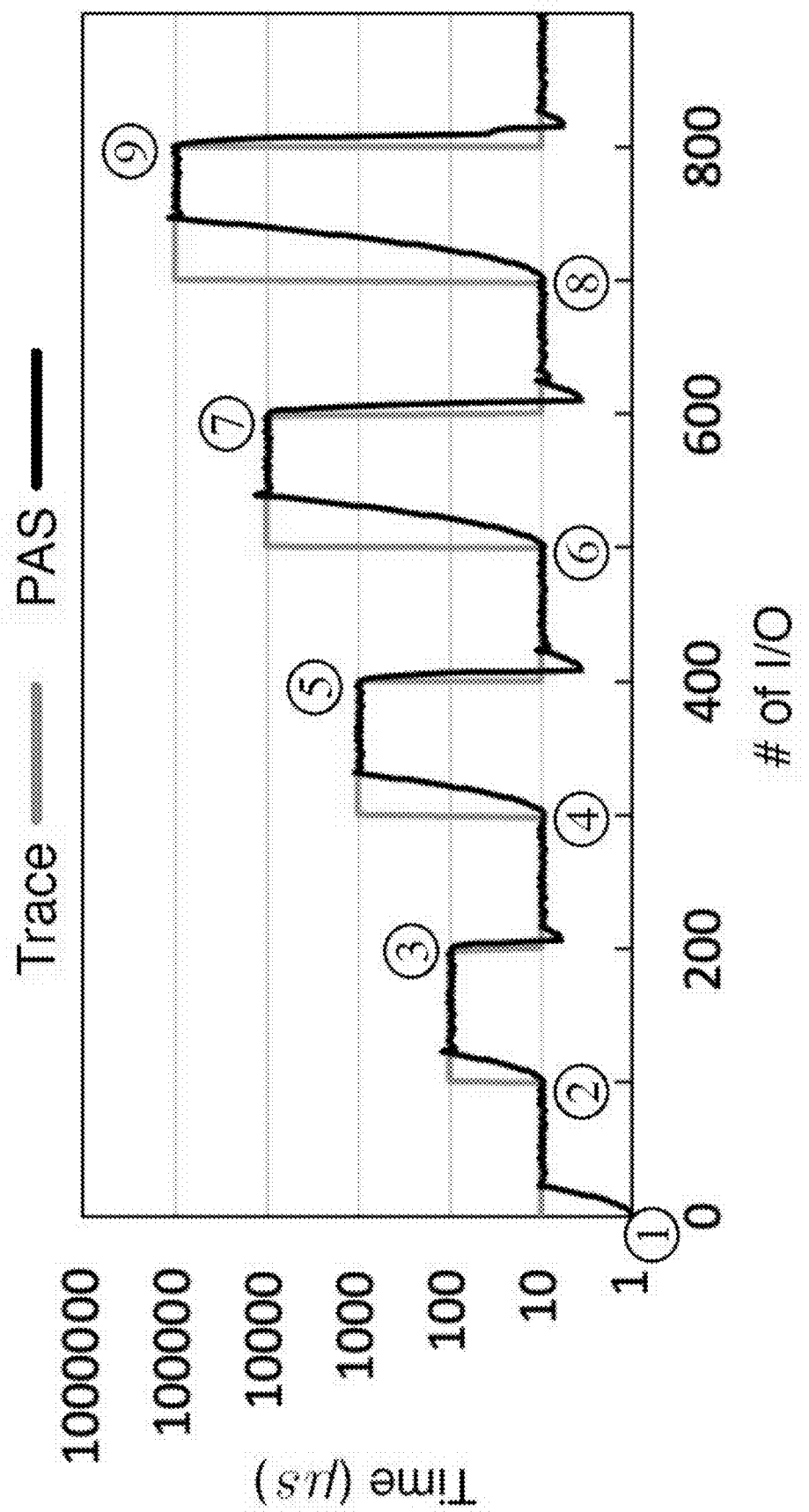

The simulation tool may be used to observe how fast the PAS tracks a rapid change of the I/O latency. For example, as shown in FIG. 11, the trace I/O latency is configured to range between 10 μs and (0.1 ms, 1 ms, 10 ms, 100 ms). Next, $t_{ramp}$, $d_{under}$, and $d_{over}$ are measured. Here, $d_{under}$ and $d_{over}$ are defined as the duration of first overshoot or undershoot after the PAS rises or drops, respectively. $t_{settle}$ is calculated by adding $t_{ramp}$ to $d_{under}$ or $d_{over}$, and the calculated value is converted to $n_{settle}$, which represents the number of I/Os. Table 3 lists the values of all the variables.

TABLE 3

| Test No. | $t_{ramp}$ | $d_{under}$ | $d_{over}$ | $t_{settle}$ | $n_{settle}$ |
|---|---|---|---|---|---|
| ① | 0.2 ms | — | 10.6 μs | 0.2 ms | 23 |
| ② | 2.2 ms | — | 0.2 ms | 2.4 ms | 24 |
| ③ | 0.4 ms | 0.1 ms | — | 0.5 ms | 45 |
| ④ | 31.0 ms | — | 1.1 ms | 32.1 ms | 32 |
| ⑤ | 3.6 ms | 0.2 ms | — | 3.8 ms | 379 |
| ⑥ | 390.0 ms | — | 4.9 ms | 394.9 ms | 41 |
| ⑦ | 36.1 ms | 0.2 ms | — | 36.2 ms | 3,623 |
| ⑧ | 4.6 s | — | 0.2 s | 4.8 s | 48 |
| ⑨ | 380.1 ms | 0.1 ms | — | 380.2 ms | 38,020 |

In tests ①, ②, ④, ⑥, and ⑧, PAS may settle within the target I/O latency among 50 I/Os regardless of ramp-up distance. On the other hand, for tests ③, ⑤, ⑦, and ⑨, the settling time is approximately proportional to the descent distance. In particular, test ⑨ shows that when the PAS decreases from 100 ms to 10 μs, $n_{settle}$ may increase up to tens of thousands.

Figure 12:
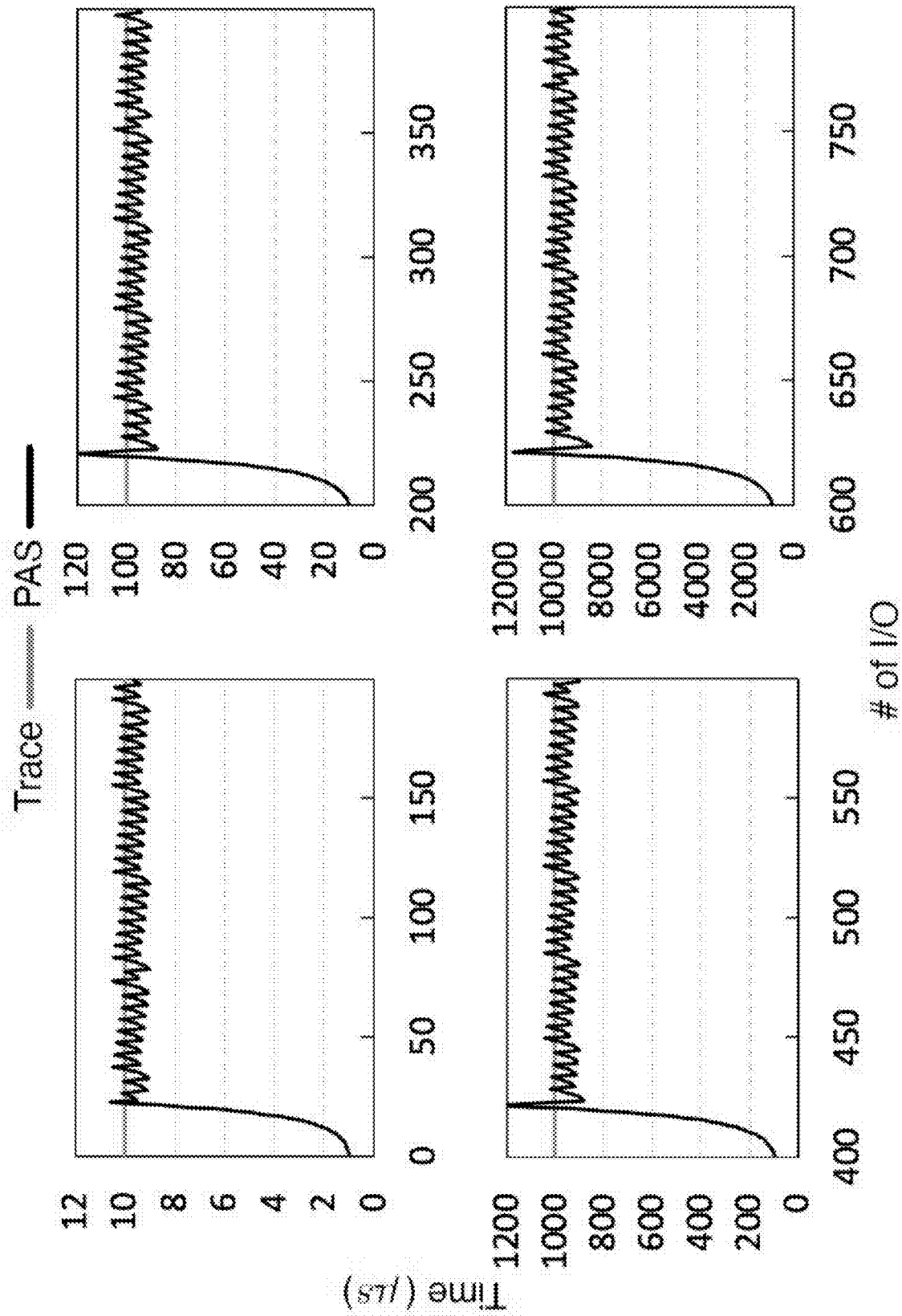

The simulation tool may be used to analyze the I/O latency tracking performance of the present disclosure in a steady state where there is no change in the I/O latency. For example, as shown in FIG. 12, while the I/O latency is increased from 10 μs to 10 ms in four steps, PAS(BL) shows stable tracking performance regardless of the magnitude of the absolute value of the I/O latency. At this time, PAS(BL) continues to generate a minute overshoot even though the device I/O latency does not change at all. Since the present disclosure maintains an optimal sleep time while intentionally generating a minute oversleep, the oversleep always occurs no matter how the values of the first and second adjustment units ($A_{up}$, $A_{dn}$) are configured. Therefore, the resulting IOPS (I/Os per second) of the present disclosure may be slightly lower than that of typical polling.

Table 4 shows resultant $T_{under}$ and $T_{over}$ of each target latency obtained from calculation of the above analysis.

TABLE 4

| I/O span | 50-199 | 250-399 | 450-599 | 650-799 |
|---|---|---|---|---|
| Target latency | 10 μs | 100 μs | 1 ms | 10 ms |
| $t_{trace}$ | 1.5 ms | 15 ms | 150 ms | 1500 ms |
| $t_{under}$ | 65 μs | 650 μs | 6,547 μs | 65 ms |
| $t_{over}$ | 7 μs | 69 μs | 666 μs | 7 ms |
| $T_{under}$ | 0.043 | 0.043 | 0.044 | 0.043 |
| $T_{over}$ | 0.005 | 0.005 | 0.0004 | 0.0005 |

Here, the ramp-up period is excluded to compare only the $T_{under}$ and $T_{over}$ values in the steady state. The values of $T_{under}$ and $T_{over}$ remain almost the same even though a target latency is increased 10 fold, which indicates that a configuration ($A_{up}$, $A_{dn}$) tailored for a particular SSD may also be applied to SSDs of different speed classes.

The experimental results show that the I/O latency tracking method for storage devices proposed in the present disclosure may secure better I/O latency tracking performance than the current implementation of hybrid polling for various types of I/O workloads.

Although the present disclosure has been described with reference to preferred embodiments given above, it should be understood by those skilled in the art that various modifications and variations of the present disclosure may be made without departing from the technical principles and scope specified by the appended claims below.

DETAILED DESCRIPTION OF MAIN ELEMENTS

100: I/O latency tracking system for storage devices
110: User terminal
130: I/O latency tracking device
150: Storage device
210: I/O command generator    230: I/O processor
250: Sleep time adjustment unit    270: Controller

What is claimed is:

1. An I/O latency tracking apparatus for storage devices, the apparatus comprising:
   an I/O command generator generating an I/O command for a storage device;
   an I/O processor providing an I/O request to the storage device based on the I/O command and completing the I/O command by polling the storage device to check I/O completion after sleeping for a sleep time; and
   a sleep time adjustment unit adjusting the sleep time based on a sequence combination composed of two latest I/O sleep results among oversleep and undersleep results obtained during the polling process.

2. The apparatus of claim 1, wherein the I/O command generator performs a lock on the sleep time adjustment unit to prevent another I/O request from obtaining access rights to the sleep time adjustment unit of the storage device when the I/O command is generated.

3. The apparatus of claim 2, wherein the I/O command generator performs an unlock on the sleep time adjustment unit to allow another I/O request to access the sleep time adjustment unit after the sleep time adjustment is completed.

4. The apparatus of claim 1, wherein the I/O processor determines oversleep or undersleep according to the I/O request during the polling process.

5. The apparatus of claim 1, wherein the sleep time adjustment unit updates the sleep time using a value obtained by multiplying a sleep adjustment factor with a preceding sleep time.

6. The apparatus of claim 5, wherein the sleep time adjustment unit increases the sleep adjustment factor by a first adjustment unit when the sequence combination is composed of undersleep and undersleep.

7. The apparatus of claim 5, wherein the sleep time adjustment unit initializes the sleep adjustment factor to 1 and decreases the sleep adjustment factor by a second adjustment unit when the sequence combination is composed of undersleep and oversleep.

8. The apparatus of claim 5, wherein the sleep time adjustment unit initializes the sleep adjustment factor to 1 and increases the sleep adjustment factor by the first adjustment unit when the sequence combination is composed of oversleep and undersleep.

9. The apparatus of claim 5, wherein the sleep time adjustment unit decreases the sleep adjustment factor by the second adjustment unit when the sequence combination is composed of oversleep and oversleep.

10. The apparatus of claim 5, wherein the sleep time adjustment unit resets the sleep adjustment factor and the sleep time to their initial value when the adjusted sleep time corresponds to a negative number.

11. An I/O latency tracking method for storage devices, the method comprising:
   generating an I/O command generating an I/O command for a storage device;
   processing an I/O command providing an I/O request to the storage based on the I/O command and completing the I/O command by polling the storage device to check I/O completion after sleeping for a sleep time; and
   adjusting a sleep time adjusting the sleep time based on a sequence combination composed of two latest I/O sleep results among oversleep and undersleep results obtained during the polling process.

* * * * *